(12) United States Patent
Aravkin et al.

(10) Patent No.: US 10,180,974 B2
(45) Date of Patent: Jan. 15, 2019

(54) SYSTEM AND METHOD FOR GENERATING CONTENT CORRESPONDING TO AN EVENT

(71) Applicant: International Business Machines Corporation, Armonk, NY (US)

(72) Inventors: Aleksandr Y. Aravkin, Bronx, NY (US); Carlos H. Cardonha, São Paulo (BR); Sasha P. Caskey, New York, NY (US); Dimitri Kanevsky, Ossining, NY (US); Tara N. Sainath, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 14/487,801

(22) Filed: Sep. 16, 2014

(65) Prior Publication Data

US 2016/0078119 A1    Mar. 17, 2016

(51) Int. Cl.
*G06F 17/30* (2006.01)
*H04L 29/08* (2006.01)

(52) U.S. Cl.
CPC ........ *G06F 17/30598* (2013.01); *H04L 67/22* (2013.01); *H04L 67/12* (2013.01)

(58) Field of Classification Search
CPC .............................................. G06F 17/30598
USPC ....................................................... 707/738
See application file for complete search history.

(56) References Cited

U.S. PATENT DOCUMENTS

| | | | |
|---|---|---|---|
| 8,264,505 B2 | 9/2012 | Bathiche et al. | |
| 2008/0214157 A1* | 9/2008 | Ramer | G06F 17/30749 |
| | | | 707/E17.102 |
| 2010/0319013 A1 | 12/2010 | Knudson et al. | |
| 2011/0026777 A1* | 2/2011 | Rhoads | G06F 17/30879 |
| | | | 382/107 |
| 2011/0038229 A1 | 2/2011 | Beaucoup | |

(Continued)

FOREIGN PATENT DOCUMENTS

| | | |
|---|---|---|
| EP | 1757087 A2 | 2/2007 |
| WO | 2000031560 A2 | 6/2000 |

(Continued)

OTHER PUBLICATIONS

Sam Laird, "Could Google Glass Change Pro Sports Forever?" Mashable, http://mashable.com/2012/06/27/google-glass-pro-sports/, Jun. 2012, 4 pages.

(Continued)

*Primary Examiner* — Pierre M Vital
*Assistant Examiner* — Alicia M Antoine
(74) *Attorney, Agent, or Firm* — David M. Quinn; Ryan, Mason & Lewis, LLP

(57) ABSTRACT

Systems and methods for generating content corresponding to an event are provided. A method for generating content corresponding to an event, comprises defining a plurality of sub-events of the event, classifying one or more actual occurrences in the event into one or more of the sub-events, monitoring behavior of one or more users to determine areas of the event of interest to the one or more users, linking the one or more users to the one or more classified actual occurrences based on the areas of the event of interest, and generating content for the one or more classified actual occurrences.

20 Claims, 3 Drawing Sheets

(56) References Cited

U.S. PATENT DOCUMENTS

| | | | |
|---|---|---|---|
| 2011/0138306 A1 | 6/2011 | Soohoo et al. | |
| 2011/0289433 A1* | 11/2011 | Whalin | G06F 17/30964 |
| | | | 715/753 |
| 2013/0036011 A1 | 2/2013 | Roberts et al. | |
| 2013/0102283 A1* | 4/2013 | Lau | G06Q 30/0261 |
| | | | 455/411 |
| 2013/0124317 A1* | 5/2013 | Ramer | G06F 17/30867 |
| | | | 705/14.53 |
| 2013/0144711 A1 | 6/2013 | Roundtree et al. | |
| 2013/0235034 A1* | 9/2013 | Reitan | G06F 3/011 |
| | | | 345/419 |
| 2013/0265223 A1* | 10/2013 | Khosravy | G06F 3/04883 |
| | | | 345/156 |
| 2014/0146177 A1* | 5/2014 | Pacor | H04N 21/21805 |
| | | | 348/157 |
| 2014/0184550 A1* | 7/2014 | Hennessey | G06F 3/013 |
| | | | 345/173 |
| 2014/0363059 A1* | 12/2014 | Hurewitz | G06Q 30/0201 |
| | | | 382/118 |
| 2015/0006278 A1* | 1/2015 | Di Censo | G06K 9/00845 |
| | | | 705/14.43 |
| 2015/0006545 A1* | 1/2015 | Das | G06F 17/30029 |
| | | | 707/748 |
| 2015/0154639 A1* | 6/2015 | Dupont | G06Q 30/0261 |
| | | | 705/14.53 |
| 2015/0217188 A1* | 8/2015 | Houvener | A63F 13/211 |
| | | | 463/7 |
| 2015/0220814 A1* | 8/2015 | Verkasalo | G06Q 20/322 |
| | | | 382/103 |
| 2016/0012475 A1* | 1/2016 | Liu | G06F 3/013 |
| | | | 705/14.49 |
| 2016/0027325 A1* | 1/2016 | Malhotra | G06F 19/3481 |
| | | | 434/252 |
| 2016/0098941 A1* | 4/2016 | Kerluke | G06F 3/017 |
| | | | 700/91 |
| 2016/0239794 A9* | 8/2016 | Shafer | G06Q 10/087 |
| 2016/0309081 A1* | 10/2016 | Frahm | G06K 9/00604 |
| 2017/0308164 A1* | 10/2017 | Kim | H04N 7/15 |

FOREIGN PATENT DOCUMENTS

| | | |
|---|---|---|
| WO | 2003044734 A2 | 5/2003 |
| WO | 2005099423 A2 | 10/2005 |
| WO | 2012145189 A2 | 10/2012 |

OTHER PUBLICATIONS

Wikipedia, "Sound Localization," http://en.wikipedia.org/wiki/Sound_localization, Sep. 2014, 13 pages.

Tracy Swedlow, "Immersive TV: Google's Holodeck 360 Kiosk," InteractiveTV Today, http://itvt.com/blog/immersive-tv-googles-holodeck-360-kiosk, Jun. 2009, 3 pages.

Danny Sullivan, "Google Holodeck: StreetView in 360 Degrees," Search Engine Land, http://searchengineland.com/google-holodeck-streetview-in-360-degrees-19808, May 2009, 8 pages.

Mark Raby, "Philips Plunges Further with "Immersive" TV Experience," http://www.tgdaily.com/electronics/35492-philips-plunges-further-with-immersive-tv-experience, Jan. 2008, 2 pages.

Maddy D. Janse, "Immersive Television From Technology to Experience," Philips Research Laboratories, http://www.hitech-projects.com/euprojects/icecream/public-presentations/EU-China%20Forum%20NexTV%20presentation.pdf, Feb. 18, 2003, 25 pages, Eindhoven, The Netherlands.

\* cited by examiner

SYSTEM AND METHOD FOR GENERATING CONTENT CORRESPONDING TO AN EVENT

TECHNICAL FIELD

The field generally relates to systems and methods for directional and block wise announcement and, in particular, systems and methods for generating content corresponding to an event.

BACKGROUND

People may or may not attend an event, such as, for example, a sporting or political event. While at or remote from the event, an individual may access coverage of the event via, for example, television, radio or internet based networks. Such coverage does not provide a user with adequate control to select parts of an event on which to focus. For example, in connection with a given coverage of a sporting event, an announcer may be speaking about a particular player, such as a goalkeeper, but the user (e.g., a listener or viewer), at that point in time, would like to know what a coach or manager is doing instead of the goalkeeper. It is axiomatic that different people may be interested in different aspects of events in progress. These different aspects may include, for example, health, energy level, present activities and/or history of event participants, recent occurrences at the event. In addition, a user may have multiple areas of interest that known coverage systems do not address, or a user may conclude that a given announcer is confusing or not practical.

Accordingly, there is a need for systems and methods of event coverage that are controllable by users, such that the users can obtain coverage of the event that is tailored to their preferences and/or needs.

SUMMARY

In general, exemplary embodiments of the invention include systems and methods for directional and block wise announcement and, in particular, systems and methods for generating content corresponding to an event.

In accordance with an embodiment of the present invention, a system automatically generates real time content of currently unfolding events, according to automatic recognition of user interest(s) in aspects of these events. For example, systems and methods, according to embodiments of the present invention, generate and match real time content to users by analyzing gesture and line of sight information for the user, and announce availability of the content to the user through a personal device, such as, for example, a portable audio and/or video device.

According to an exemplary embodiment of the present invention, a method for generating content corresponding to an event, comprises defining a plurality of sub-events of the event, classifying one or more actual occurrences in the event into one or more of the sub-events, monitoring behavior of one or more users to determine areas of the event of interest to the one or more users, linking the one or more users to the one or more classified actual occurrences based on the areas of the event of interest, and generating content for the one or more classified actual occurrences.

According to an exemplary embodiment of the present invention, a system for generating content corresponding to an event, comprises a tracking module, wherein the tracking module comprises a sub-event tracker capable of defining a plurality of sub-events of the event, and capable of classifying one or more actual occurrences in the event into one or more of the sub-events, and an interest tracker capable of monitoring behavior of one or more users to determine areas of the event of interest to the one or more users. The system further comprises an analysis module comprising a linking module capable of linking the one or more users to the one or more classified actual occurrences based on the areas of the event of interest, and a content generation module capable of generating content for the one or more classified actual occurrences.

According to an exemplary embodiment of the present invention, a computer program product for generating content corresponding to an event, comprises a computer readable storage medium having program instructions embodied therewith, the program instructions executable by a processor to cause the processor to perform a method comprising defining a plurality of sub-events of the event, classifying one or more actual occurrences in the event into one or more of the sub-events, monitoring behavior of one or more users to determine areas of the event of interest to the one or more users, linking the one or more users to the one or more classified actual occurrences based on the areas of the event of interest, and generating content for the one or more classified actual occurrences.

These and other embodiments of the invention will become apparent from the following detailed description of illustrative embodiments thereof, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION

Figure 1:
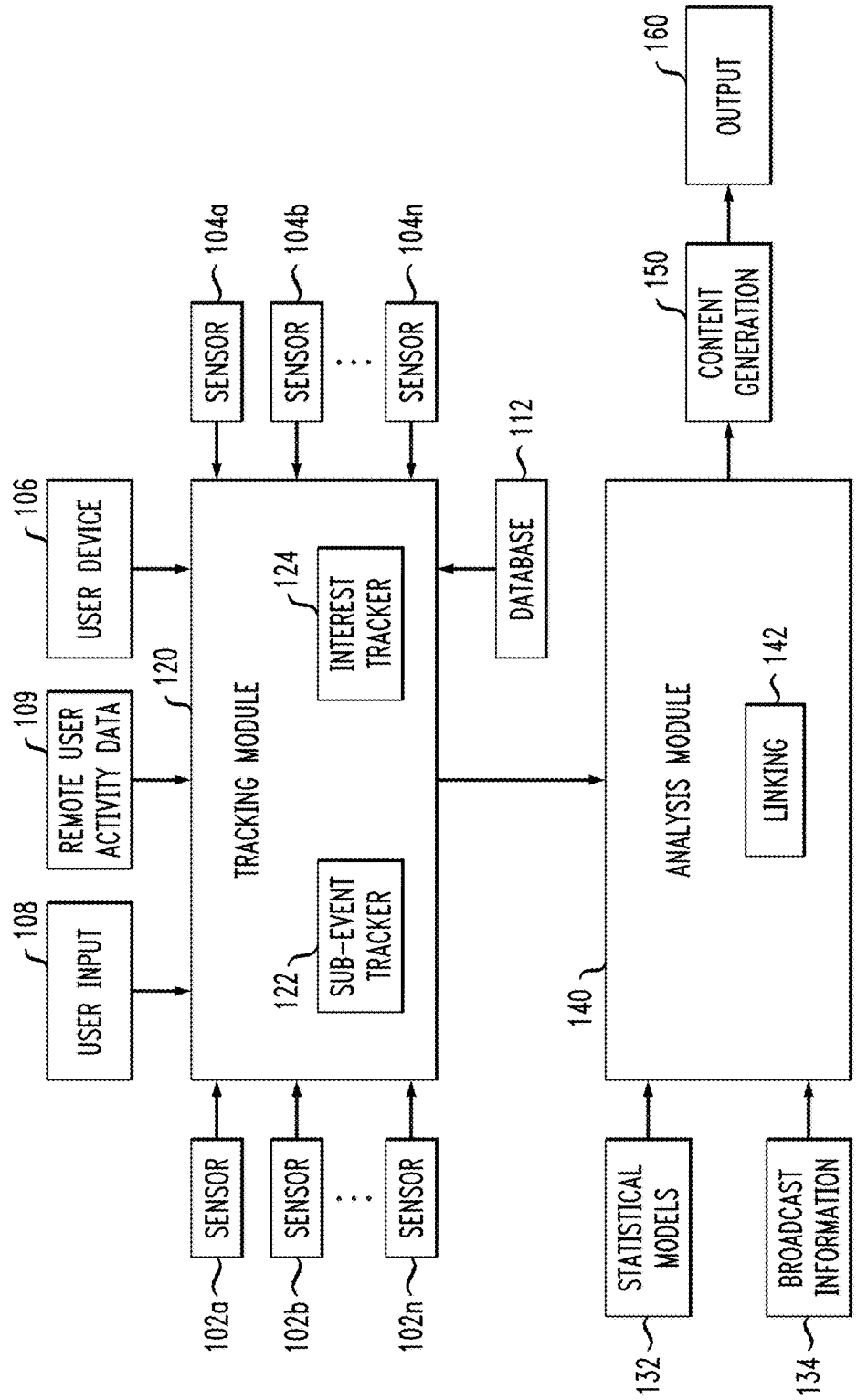
FIG. 1 is a block diagram of a system for generating content corresponding to an event, according to an exemplary embodiment of the present invention.

Exemplary embodiments of the invention will now be discussed in further detail with regard to systems and methods for directional and block wise announcement and, in particular, systems and methods for generating content corresponding to an event. This invention may, however, be embodied in many different forms and should not be construed as limited to the embodiments set forth herein.

As used herein, an "attendee" can refer to a person attending a main event.

As used herein, an "event" or "main event" can refer to an event in a general context, such as, for example, games or matches (e.g., football, soccer, tennis, fighting, etc.), an Olympic competition, races, concerts, performances, ceremonies, speeches, rallies, meetings and debates.

As used herein, a "sub-event" can refer to an occurrence within the main event, such as, for example, a play, a fight, a goal, a referee call, a foul, a song or a comment.

As used herein, an "event area" can refer to a physical space where main events can take place, such as, for example, a stadium, arena, field, rink, pool, theater or racetrack, etc.

As used herein, a "plausible sub-event" can refer to a sub-event that may occur and be of interest at a given main event.

As used herein, an "active sub-event" or "actual sub-event" can refer to a sub-event, which has occurred and may currently be of interest to one or more attendees.

As used herein, an "announcer" or "broadcaster" can refer to a person describing sub-events going on in a main event.

While attending, or remotely viewing or listening to, a main event, people will be interested in various sub-events. Embodiments of the present invention aim to generate content on demand, based on interest of an attendee, or of a remote viewer or listener, without the need for dedicated announcers describing all possible sub-events. Once content is generated, it is then communicated to the attendees and/or remote viewers or listeners.

In accordance with an embodiment of the present invention, an automatic content generation system is capable of monitoring a large variety of events and sub-events, understanding the sub-events, and adequately describing the sub-events. The system can monitor, in parallel, different events and sub-events in different locations by using a variety of sensors 102a, 102b, . . . 102n distributed throughout an observation area, including, but not limited to, cameras, microphones, motion sensors and biometric sensors. Biometric sensors gather data corresponding to, for example, physiological and behavioral characteristics including, but not limited to, an individual's voice, movements, gestures, expressions, posture, etc.

Embodiments of the present invention provide a mechanism to allow users to focus on their preferred sub-events. By observing a user's movements (e.g., head and body movements, gestures (e.g., pointing)) and/or line of sight, embodiments of the present invention direct a focus of the content generation system for that user. For example, if a user is attending an event and is looking at a particular area (e.g., the goal area at a soccer game), sub-events around that area will be announced. If the user switches to looking at reserve players, sub-events around the reserve player area, such as, for example, a sideline or bench area, may be announced.

Monitoring of a user's gaze and movements is done through sensors 104a, 104b, . . . 104n mounted on the user and/or at locations in the event venue near the user. For example, a direction where a user is looking can determine the geography of the events or sub-events that will be monitored and reported on. As noted above, users can be located in a place where the event is occurring, such as, for example, a sports stadium, or can be watching remotely from another location, looking at a representation of the location (e.g., a television or other audio/video feed, a picture, 3D audio or another reproduction).

If the user is located on the event premises, embodiments of the present invention can associate the user's gaze with the user's point(s) of interest. If the user is located remotely, in accordance with an embodiment of the present invention, there is a virtual map between user movements and the representation of the location, so that a remote user's gaze at a particular point on the display of the event can be mapped to a particular location where a sub-event is occurring. An embodiment of the present invention can use an electronic device 106, for example, a cellphone, smartphone or optical head-mounted display (OHMD), to detect line of sight and/or movement data, such as, for example, where and how fast users turn their heads and bodies, and determine the location of sub-events of interest that are to be described. The phone or OHMD can include, for example, gyroscopic functionality in order to furnish the line of sight and movement data.

Other mechanisms may be used to control a direction or focus of the content generation system. For example, a user can directly inform the system (see element 108 in FIG. 1) to report on (or not report on) a particular sub-event or participant (e.g., a goalie) by clicking or inputting a request into a text field. The request or instruction can also be made via a voice command. For example, a user could inform the system to "show or explain to me what a particular player (e.g., goalie) is doing right now." This feature may be useful for sight-impaired attendees, who seek a verbal description of a particular sub-event. A content generation system, in accordance with an embodiment of the present invention, provides, to a user, a stream of audio and/or a visual representation representing sub-events of interest.

When a user looks in a direction, this can significantly limit plausible sub-events of interest. Embodiments of the present invention can use statistical models 132 to update probabilities of user interest in sub-events based on user information and population analysis. For example, general characteristics of the user, as well as past history of interest, can be used to generate a likelihood of interest in each of the plausible sub-events. Embodiments of the present invention also contemplate using statistical models 132 including population analysis to improve the system. For example, when users are simultaneously active, estimates of interest probabilities can be improved by using information about which sub-events are of interest to many people to assess the probability that a given sub-event is interesting to a particular person looking in the direction of that sub-event. In other words, a probability of whether a sub-event is of interest to a particular user can be increased if a majority or relatively large number of number of people are also interested in that particular sub-event. In accordance with an embodiment of the present invention, the statistical models 132 may be useful when ascertaining sub-events of interest to users who may not necessarily be viewing the sub-events (e.g., users away from action (e.g., at a vendor, restroom, etc.) or sight-impaired individuals).

FIG. 1 shows a block diagram of a system for generating content corresponding to an event, in accordance with an embodiment of the present invention. The system 100 includes a tracking module 120 having a sub-event tracker module 122 and an interest tracker module 124, and an analysis module 140 including a linking module 142. The system 100 further includes a content generation module 150 and an output module 160.

In accordance with an embodiment of the present invention, based on the context of an event, the sub-event tracker 122 defines a universe of plausible sub-events for the event. For example, for a soccer game, the universe of plausible sub-events can include goals, passes, fights, offensive plays, defensive plays, referee calls, and penalty kicks. The sub-event tracker 122 also tracks action in an event area, and classifies one or more actual occurrences in the event into one or more of the defined sub-events. The sub-event tracker 122 compares the one or more tracked actual occurrences with the universe of plausible sub-events to find a match and make the classification. For example, if a goal occurred, this can be detected with one or more sensors 102, 102b, . . . , 102n, such as for example, cameras and microphones, and classified under a goal sub-event. The sub-event tracker 122 also assigns data to the actual occurrence (also referred to as an "active sub-event"), such as, for example, the name and jersey number person scoring the goal. The information associated with the sub-event can be determined from the sensor data and available information on the participants in the event from a database 112, such as, for example, an online database.

The interest tracker 124 is capable of monitoring behavior of one or more users to determine areas of the event that are of interest to the one or more users. The users may be, for example, attendees at an event, or people remotely viewing or listening to the event from another location. 13. The interest tracker 124 obtains, for example, line of sight data and/or gesture data for the one or more users from one or more sensors 104a, 104b, . . . 104n. The sensors 104a, 104b, . . . 104n can be, for example, cameras, microphones, motion sensors, and/or biometric sensors strategically placed in a venue and/or on the one or more users. Based on the behavior of the one or more users (e.g., attendees at an event), the sensors 104a, 104b, . . . 104n can retrieve data regarding, for example, line of sight, gestures, such as pointing, and other indications to identify event areas where something has occurred to peak the users' interest. The interest tracker 124 is further capable of obtaining directional data and/or movement data for the one or more users from an electronic device 106, such as a phone or OHMD on the one or more users. As discussed above, the electronic device can have gyroscopic functionality to provide the directional and/or movement data.

The interest tracker 124 is further capable of obtaining a user input 108 (discussed above), such as, for example, a selection of an icon on a user interface, a textual input and/or a voice input from the one or more users to determine the areas of the event that are of interest to the one or more users.

In the case of a remotely located user, in accordance with an embodiment of the present invention, there can be a virtual map between user movements and the representation of the location. As a result, the interest tracker 124 receives remote user activity data 109, such as, for example, data corresponding to a remote user's gaze at a particular point on the display of the event, which can be mapped, using the virtual map, to a particular location where a sub-event is occurring.

The linking module 142 links the one or more users to the one or more classified actual occurrences based on the areas of the event that are determined to be of interest to the one or more users. For example, once an attendee has indicated an area of interest or an area of interest for an attendee has been determined, the linking module 142 selects the most likely sub-event of interest for the particular attendee. The analysis module 140 analyzes the sensed data, for example, line of sight data and/or gesture data, to determine the areas of the event that are of interest to the one or more users. As discussed above, the analysis module 140 can incorporate statistical models 132 into the analyzing, wherein the statistical models 132 include, for example, at least one of an interest history of the one or more users, and data on current areas of the event that are of interest to multiple users. User information that can be used in connection with statistical modeling includes, for example, past responses of an individual, and knowledge level of an individual regarding an event.

The content generation module 150 generates content for the one or more classified actual occurrences. Once the system 100 has identified the sub-events of interest, content can be generated that describes these events. In accordance with an embodiment, the content generation module 150 is able to retrieve details of a sub-event, such as, for example, that a goal was scored by a particular player, and generate a verbal description of the sub-event. For example, if the sub-event is a goal, the system will already know who scored the goal and who assisted (based, for example, on camera information and jersey identification), and can generate a message, such as "A scored a goal, assisted by B." This content is communicated via the output module 160 to interested users via, for example, personalized listening devices.

According to an embodiment of the present invention, prior to content generation, an analysis module 140 is capable of accessing broadcast information 134 for the event to determine if a sub-event deemed to be of interest already has announced comments, for example, from a television or a radio network. If the analysis module 140 determines that the sub-event deemed to be of interest already has announced comments, the analysis module 140 can make a decision forego content generation in this case, or generate additional comments.

According to an embodiment, if the analysis module 140 determines that a sub-event deemed to be of interest does not already have comments, the analysis module verifies whether content can be generated for the sub-event, and if content can be generated, the analysis module 140 sends a request to the content generation module 150 to generate content corresponding to the sub-event of interest. As explained above, the content generation module 150 generates a computer-generated description of the sub-event. In accordance with an embodiment, in addition to being a verbal description, the generated content can include video. The video may include replays from earlier events, advertisements tailored to user interests gleaned from, for example, past user activity and/or social networks, and video of the sub-event including highlighted and/or deemphasized (e.g., blacked-out, grayed) portions to focus a viewer on particular aspects of the video.

The output module 160 automatically communicates the content for the one or more classified actual occurrences to the one or more linked users. In accordance with an embodiment of the present invention, the content can be directed to predetermined subsets of system users, such as, for example, users with portable electronic devices (e.g., smartphones, tablets, OHMDs), users with a profile, users watching an event, users not watching an event, users selected by location, etc.

The components of the system 100 can be physically connected to each other, for example, via a wired connection, and/or wirelessly connected to each other, for example, via a network, such as, for example, a local area network (LAN), wide area network (WAN), cellular network, satellite network or the Internet.

Figure 2:
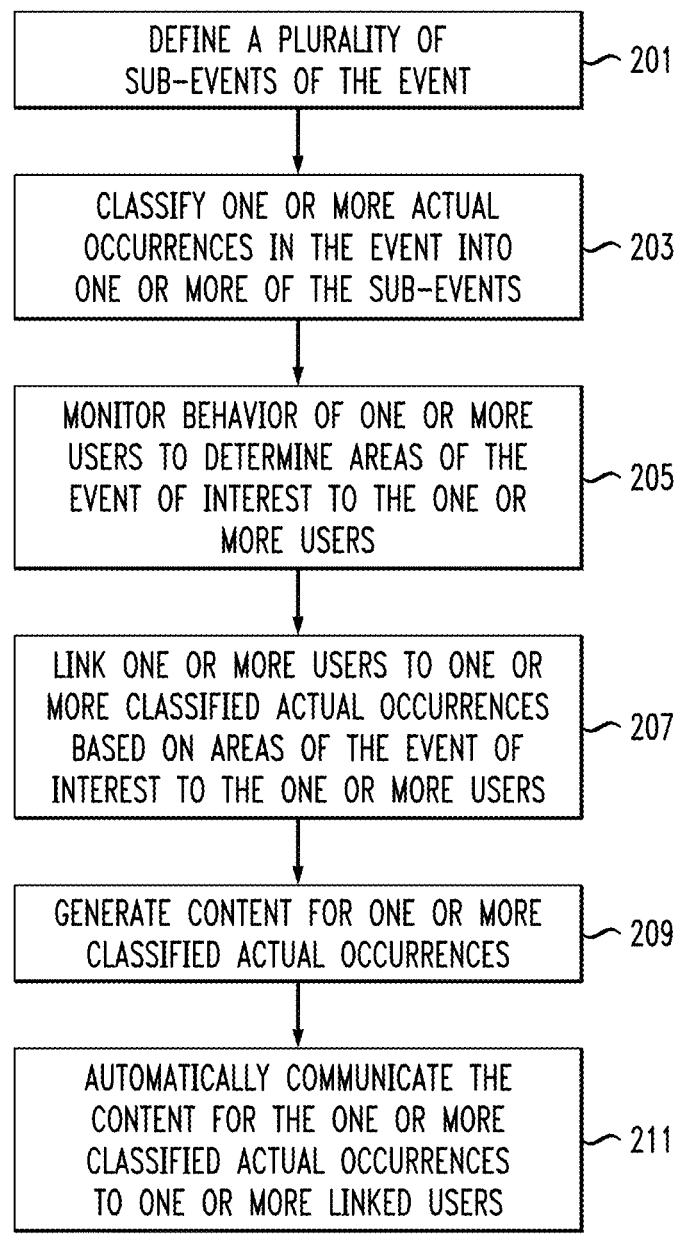
FIG. 2 illustrates a flow diagram of a method for generating content corresponding to an event, according to an exemplary embodiment of the present invention.

FIG. 2 is a flow diagram of a method for generating content corresponding to an event, in accordance with an exemplary embodiment of the present invention. The method 200 includes defining a plurality of sub-events of the event (block 201). For example, based on the context of an event, a universe of plausible sub-events for the event is defined. The method further includes classifying one or more actual occurrences in the event into one or more of the sub-events (block 203). For example, action in an event area is tracked, one or more tracked actual occurrences are compared with the universe of plausible sub-events to find a match, and a classification is made of the one or more actual occurrences in the event into one or more of the defined sub-events. The method further includes monitoring behavior of one or more users to determine areas of the event of interest to the one or more users (block 205). The monitoring can comprise obtaining line of sight data and/or gesture data for one or more users from one or more sensors, obtaining directional data and/or movement data for one or more users from an electronic device on the one or more users, and/or obtaining a textual input and/or a voice input from one or more users to determine the areas of the event that are of interest to the one or more users.

The method further includes linking one or more users to the one or more classified actual occurrences based on the areas of the event that are of interest to the one or more users (block 207). For example, once an attendee has indicated an area of interest or an area of interest for an attendee has been determined, the most likely sub-event of interest for the particular attendee is selected.

The method further includes generating content for one or more classified actual occurrences (block 209) and automatically communicating the content for the one or more classified actual occurrences to one or more linked users (block 211).

The method may further comprise analyzing the line of sight data and/or the gesture data to determine the areas of the event that are of interest to the one or more users. Statistical models, including, for example, an interest history of one or more users and/or data on current areas of the event that are of interest to multiple users, can be incorporated into the analyzing.

It is to be understood that while the embodiments of the present invention have been mostly discussed in connection with sporting events, the embodiments are not necessarily limited thereto, and may be applicable, for example, to other types of events as indicated above, such as, for example, concerts, performances, ceremonies, speeches, rallies, meetings and debates.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
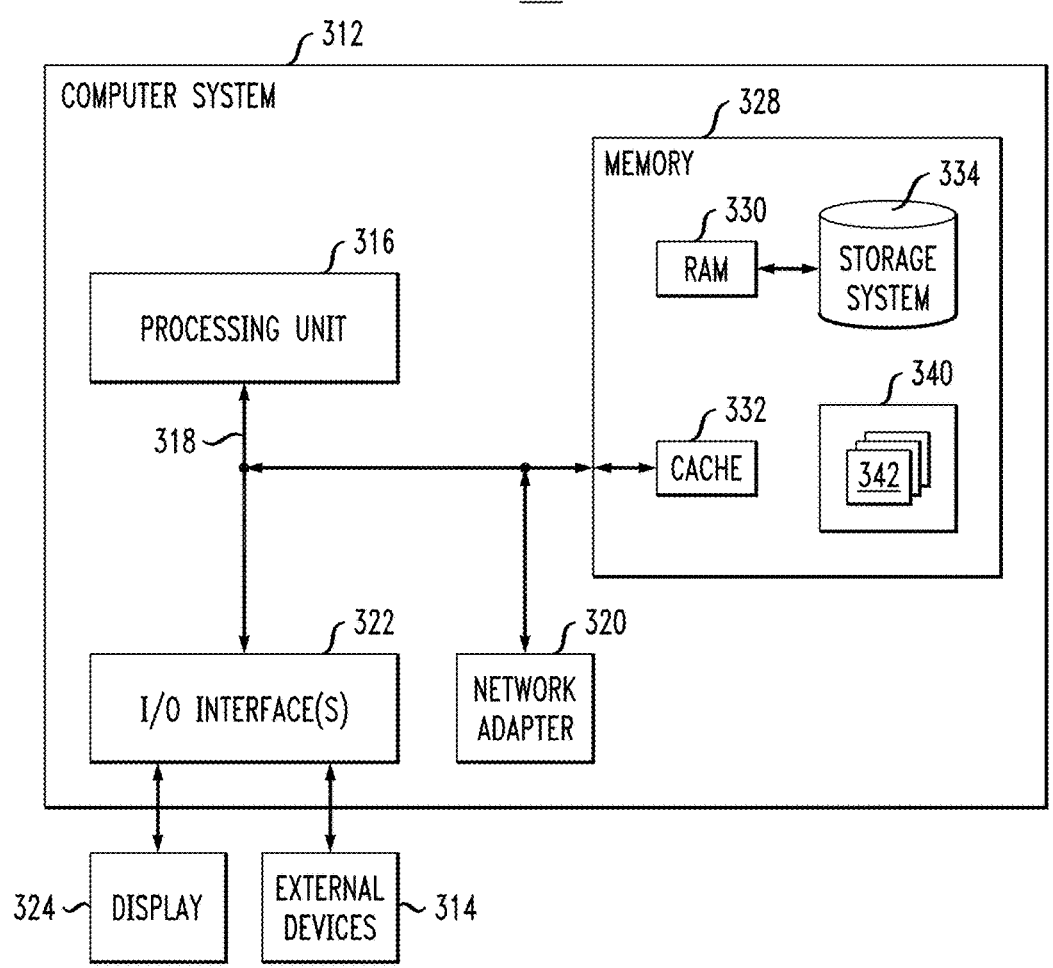
FIG. 3 illustrates a computer system that may be used to implement one or more components/steps of the techniques of the invention, according to an exemplary embodiment of the invention.

One or more embodiments can make use of software running on a general-purpose computer or workstation. With reference to FIG. 3, in a computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

The bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 312 typically includes a variety of computer system readable media. Such media may be any available media that is accessible by computer system/server 312, and it includes both volatile and non-volatile media, removable and non-removable media.

The system memory 328 can include computer system readable media in the form of volatile memory, such as random access memory (RAM) 330 and/or cache memory 332. The computer system/server 312 may further include other removable/non-removable, volatile/nonvolatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 318 by one or more data media interfaces. As depicted and described herein, the memory 328 may include at least one program product having a set (e.g., at least one) of program modules that are configured to carry out the functions of embodiments of the invention. A program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc., one or more devices that enable a user to interact with computer system/server 312, and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for generating content corresponding to an event, comprising:
  defining a plurality of sub-events of the event, wherein the plurality of sub-events include a plurality of occurrences that may occur within and during the event;
  identifying one or more actual occurrences occurring during the event;
  classifying at least one of the one or more actual occurrences as one or more active sub-events;
  monitoring behavior of one or more users to determine interest of the one or more users in the one or more active sub-events, wherein the monitoring comprises:
    obtaining at least one of line of sight data and gesture data for the one or more users from one or more sensors positioned separate from the one or more users and to capture at least one of the line of sight data and the gesture data for the one or more users; and
    determining that the one or more users are observing the one or more active sub-events based on at least one of the line of sight data and the gesture data, wherein the line of sight data is based on a tracked gaze of the one or more users and the gesture data is based on a tracked gesture of the one of more users toward a particular location in a venue where the one or more active sub-events are occurring;
  linking, based on the determining, each of the one or more users to a corresponding active sub-event that the one or more users have been determined to be observing;
  generating content for the one or more active sub-events;
  wherein the content comprises a description that is generated in response to and describes an actual activity occurring in real time in the one or more active sub-events, and a video accompanying the description;
  wherein the one or more users are directly observing the actual activity;
  wherein the generating of the content for the one or more active sub-events comprises:
    retrieving and analyzing details of the activity occurring in real time in the one or more active sub-events;
    automatically generating the description of the activity occurring in real time in the one or more active sub-events based on the retrieved and analyzed details, wherein the description comprises a verbal audio description of the actual activity that the one or more users are observing; and
    automatically generating the video accompanying the description, wherein the video includes at least one of a replay from one or more previous events and a video of the activity occurring in real time in the one or more active sub-events, and wherein the video is modified to include at least one of highlighted and deemphasized portions; and
  outputting to each of the one or more users, the content of the corresponding active sub-event that the one or more users have been determined to be observing in an audio and video stream;
  wherein the steps of the method are performed by a computer system comprising a memory and at least one processor coupled to the memory.

2. The method according to claim 1, wherein the outputting comprises automatically transmitting over at least one communication network the content to respective devices of the one or more users.

3. The method according to claim 1, further comprising analyzing at least one of the line of sight data and the gesture data to determine the one or more active sub-events that the one or more users are observing.

4. The method according to claim 3, further comprising incorporating statistical models into the analyzing.

5. The method according to claim 4, wherein the statistical models include an interest history of the one or more users, and data on current active sub-events determined as being observed by multiple users.

6. The method according to claim 1, wherein monitoring the behavior of the one or more users further comprises obtaining at least one of directional data and movement data for the one or more users from an electronic device on the one or more users.

7. The method according to claim 1, wherein monitoring the behavior of the one or more users further comprises obtaining at least one of a textual input and a voice input from the one or more users to determine the one or more active sub-events that the one or more users are observing.

8. The method according to claim 1, further comprising tracking the one or more actual occurrences with one or more additional sensors to acquire data about the one or more actual occurrences, wherein the classifying includes comparing the one or more tracked actual occurrences with the plurality of sub-events to match the one or more tracked actual occurrences with one or more defined sub-events.

9. A system for generating content corresponding to an event, comprising:
  a tracking module executed via at least one processor operatively connected to a memory, wherein the tracking module comprises:
    a sub-event tracker capable of:
      defining a plurality of sub-events of the event, wherein the plurality of sub-events include a plurality of occurrences that may occur within and during the event;
      identifying one or more actual occurrences occurring during the event; and
      classifying at least one of the one or more actual occurrences as one or more active sub-events; and
    an interest tracker capable of monitoring behavior of one or more users to determine interest of the one or more users in the one or more active sub-events, wherein the monitoring comprises:
      obtaining at least one of line of sight data and gesture data for the one or more users from one or more sensors positioned separate from the one or more users and to capture at least one of the line of sight data and the gesture data for the one or more users; and
      determining that the one or more users are observing the one or more active sub-events based on at least one of the line of sight data and the gesture data, wherein the line of sight data is based on a tracked gaze of the one or more users and the gesture data is based on a tracked gesture of the one of more users toward a particular location in a venue where the one or more active sub-events are occurring;
  an analysis module executed via at least one processor operatively connected to a memory, the analysis module comprising a linking module capable of linking, based on the determining, each of the one or more users to a corresponding active sub-event that the one or more users have been determined to be observing;
a content generation module executed via at least one processor operatively connected to a memory and capable of generating content for the one or more active sub-events;
wherein the content comprises a description that is generated in response to and describes an activity occurring in real time in the one or more active sub-events, and a video accompanying the description;
wherein the one or more users are directly observing the actual activity;
wherein the generating of the content for the one or more active sub-events comprises:
retrieving and analyzing details of the activity occurring in real time in the one or more active sub-events;
automatically generating the description of the activity occurring in real time in the one or more active sub-events based on the retrieved and analyzed details, wherein the description comprises a verbal audio description of the actual activity that the one or more users are observing; and
automatically generating the video accompanying the description, wherein the video includes at least one of a replay from one or more previous events and a video of the activity occurring in real time in the one or more active sub-events, and wherein the video is modified to include at least one of highlighted and deemphasized portions; and
an output module executed via at least one processor operatively connected to a memory and capable of outputting to each of the one or more users, the content of the corresponding active sub-event that the one or more users have been determined to be observing in an audio and video stream.

10. The system according to claim 9, wherein the outputting comprises automatically transmitting over at least one communication network the content to respective devices of the one or more users.

11. The system according to claim 9, wherein the analysis module is further capable of analyzing at least one of the line of sight data and the gesture data to determine the one or more active sub-events that the one or more users are observing.

12. The system according to claim 11, wherein the analysis module is further capable of incorporating statistical models into the analyzing.

13. The system according to claim 12, wherein the statistical models include an interest history of the one or more users, and data on current active sub-events determined as being observed by multiple users.

14. The system according to claim 9, wherein the interest tracker is further capable of obtaining at least one of directional data and movement data for the one or more users from an electronic device on the one or more users.

15. The system according to claim 9, wherein the interest tracker is further capable of obtaining at least one of a textual input and a voice input from the one or more users to determine the one or more active sub-events that the one or more users are observing.

16. The system according to claim 9, wherein the sub-event tracker is further capable of tracking the one or more actual occurrences using one or more additional sensors to acquire data about the one or more actual occurrences, and comparing the one or more tracked actual occurrences with the plurality of sub-events to match the one or more tracked actual occurrences with one or more defined sub-events.

17. A computer program product for generating content corresponding to an event, the computer program product comprising a non-transitory computer readable storage medium having program instructions embodied therewith, the program instructions executable by a processor to cause the processor to perform a method comprising:
defining a plurality of sub-events of the event, wherein the plurality of sub-events include a plurality of occurrences that may occur within and during the event;
identifying one or more actual occurrences occurring during the event;
classifying at least one of the one or more actual occurrences as one or more active sub-events;
monitoring behavior of one or more users to determine interest of the one or more users in the one or more active sub-events, wherein the monitoring comprises:
obtaining at least one of line of sight data and gesture data for the one or more users from one or more sensors positioned separate from the one or more users and to capture at least one of the line of sight data and the gesture data for the one or more users; and
determining that the one or more users are observing the one or more active sub-events based on at least one of the line of sight data and the gesture data, wherein the line of sight data is based on a tracked gaze of the one or more users and the gesture data is based on a tracked gesture of the one of more users toward a particular location in a venue where the one or more active sub-events are occurring;
linking, based on the determining, each of the one or more users to a corresponding active sub-event that the one or more users have been determined to be observing;
generating content for the one or more active sub-events;
wherein the content comprises a description that is generated in response to and describes an activity occurring in real time in the one or more active sub-events, and a video accompanying the description;
wherein the one or more users are directly observing the actual activity;
wherein the generating of the content for the one or more active sub-events comprises:
retrieving and analyzing details of the activity occurring in real time in the one or more active sub-events;
automatically generating the description of the activity occurring in real time in the one or more active sub-events based on the retrieved and analyzed details, wherein the description comprises a verbal audio description of the actual activity that the one or more users are observing; and
automatically generating the video accompanying the description, wherein the video includes at least one of a replay from one or more previous events and a video of the activity occurring in real time in the one or more active sub-events, and wherein the video is modified to include at least one of highlighted and deemphasized portions; and
outputting to each of the one or more users, the content of the corresponding active sub-event that the one or more users have been determined to be observing in an audio and video stream.

18. The method according to claim 1, wherein the content further comprises audio of announced comments from a broadcast network accompanying the description, wherein the announced comments correspond to the actual activity that the one or more users are observing.

19. The system according to claim 9, wherein the content further comprises audio of announced comments from a broadcast network accompanying the description, wherein the announced comments correspond to the actual activity that the one or more users are observing.

20. The computer program product according to claim 17, wherein the content further comprises audio of announced comments from a broadcast network accompanying the description, wherein the announced comments correspond to the actual activity that the one or more users are observing.

* * * * *